United States Patent [19]

Nae et al.

[11] Patent Number: 5,358,562
[45] Date of Patent: Oct. 25, 1994

[54] ORGANOCLAY RHEOLOGICAL ADDITIVE FOR CLEAR SYSTEMS

[75] Inventors: H. Nae, Princeton Junction, N.J.; R. Sivasubramanian, Newtown, Pa.; D. Smith, Cologne, Fed. Rep. of Germany; G. Schütte, Bergish Gladbach, Fed. Rep. of Germany; M. Skibbe, Leverkusen, Fed. Rep. of Germany

[73] Assignee: Rheox, Inc., Hightstown, N.J.

[21] Appl. No.: 88,059

[22] Filed: Jul. 8, 1993

[51] Int. Cl.$^5$ .............................................. C04B 14/04
[52] U.S. Cl. .................. 106/487; 106/284.01; 501/148
[58] Field of Search ................ 501/148; 106/486, 487, 106/284.01, 632

[56] References Cited

U.S. PATENT DOCUMENTS

| | | | |
|---|---|---|---|
| 2,531,825 | 11/1950 | Peterson et al. | 252/163 |
| 4,412,018 | 10/1983 | Finlayson et al. | 523/508 |
| 4,419,250 | 12/1983 | Allen et al. | 252/8.6 |
| 4,526,702 | 7/1985 | Parr et al. | 252/174.25 |
| 4,620,993 | 11/1986 | Suss et al. | 427/407.1 |
| 4,620,994 | 11/1986 | Suss et al. | 427/407.1 |

OTHER PUBLICATIONS

Official Digest Federation Paint and Varnish Production Clubs—vol. 294 pp.451–463 (1949), no month.
Sonderdruk Avs Der Kolloid—Zeit Schrift—Apr. 1954—J. W. Jordan and F. J. Williams—authors—pp. 40–47, no month.

*Primary Examiner*—Karl Group
*Assistant Examiner*—Chris Gallo
*Attorney, Agent, or Firm*—Michael J. Cronin

[57] ABSTRACT

Organoclays made from smectite-type clays are described as rheological additives for clear systems including clear coat paints, lacquers, varnishes and personal care products. Such additives impart desirable properties to such systems and do not adversely impact the desired properties of clarity and transparency required in such systems.

12 Claims, No Drawings

ORGANOCLAY RHEOLOGICAL ADDITIVE FOR CLEAR SYSTEMS

The present invention relates to organophilic clays which are dispersible in clear systems, including paints, lacquers, varnishes and other products, to alter the rheology of such systems without reducing the clarity or the gloss of the clear system. The invention pertains to a process for preparing these organophilic clays and to clear compositions containing same.

DESCRIPTION OF THE PRIOR ART

Many recent industrial and consumer products are, for a variety of reasons, being manufactured in a clear form, that is to be effectively transparent. Such transparency is intended to indicate in many cases a more natural and pure product which will appeal to customers both cosmetically and as an indication of the product's purity. Such products can include water based systems, for example, detergents, lotions and various household and personal care products.

Importantly, aqueous and solvent-based systems, for example, paints and coatings used as clear automobile top coats and furniture varnishes and lacquers, have become increasingly utilized to impart various properties, including highlighting of new types of base coats. When used as paints and varnishes, such clear coatings are applied directly on the substrate to be coated, or on an initial base coat, to protect the substrate and at the same time to impart a clear, shiny look to the product. When used with a base coat, the clear coating also protects the base coating from damages such as scratches and stains, and adds a variety of aesthetic qualities to the system involved.

In the past, paints, lacquers and varnishes have contained about 80% solvent. The thickening effect in such paints, lacquers and varnishes is achieved mostly by solvent evaporation. There is a trend in the industry in which manufacturers of such systems move from high solvent systems to higher solids systems to comply with stricter environmental limits on volatile organic emissions. Since there is less solvent in such systems, there is a need to modify the rheological properties of the particular system by use of a thickener which will impart sag resistance and shear thinning behavior without reducing the clarity and gloss of the coating.

Multicoat coating systems are particularly common in systems for use as automotive paints. When multicoat coating systems are applied, it is difficult to obtain coatings having uniformly high gloss while at the same time maintaining good color and clarity.

In the automotive industry two significant systems are utilized in the painting of automobiles. One topcoat system utilizes thermoplastic resins. In this system the polymers are homopolymers or copolymers of methyl methacrylate, acrylic acid, methacrylic acid, alkyl esters of acrylic acid or methacrylic acid, vinyl acetate, acrylonitrile, styrene and the like. Other topcoat systems use acrylic melamine resins or urethane based resins. These paint systems possess chemical resistance, resistances to cracking, and other useful properties. It has been an objective of the automobile industry in continually improve the aesthetic properties of such systems.

In these uses a pigmented base coat composition is applied to a metal substrate to hide imperfections and blemishes and to provide the aesthetically pleasing colors desired. It is followed by the application of a "clear coat" topcoat. The most significant quality of the clear topcoat is that it provide a transparent film. The term "transparent film" is defined as a film through which the coat below (basecoat) can be seen. Sometimes the transparent coat contains an ultraviolet absorbing compound. Most importantly however for the top coat is that it must be substantially colorless so that the full polychromatic and aesthetic effect of the basecoat is not decreased. In some instances, of course desirable and unique styling effects can be obtained by the addition of contrasting or complementary colors or particles to the topcoat. Another feature of the topcoat is the significant improvement in the durability which is provided to the overall coating composition.

The systems using a clear topcoat are not without problems. The overall aesthetic quality of the coating is dependent on the quality of the base coat. The clear top coat magnifies any weakness in this base coat, including the highlighting of any color deficiencies. In addition, many of the coating systems in use today utilize metal particles in the base coat to provide an aesthetically pleasing metallic appearance. The use of metallic pigments can inadvertently result in color loss in the base coat.

It is well known in the art to utilize clays and in particular smectite clays as rheological modifiers or additives in various systems. E.g., U.S. Pat. No. 4,419,250 describes the use of bentonite as a laundry detergent. U.S. Pat. No. 4,526,702 describes a fabric softener containing a bentonite which has been modified in part with an organic compound.

Organoclays have also been commonly used in paints and coatings to serve a number of rheological and viscosity modifying functions, but have not found use in clear or transparent topcoat systems. For example, U.S. Pat. Nos. 4,620,993 and 4,620,994 describe a two-layer coating system with a basecoat containing an organomodified clay and an additional solvent-borne transparent coat which does not contain such an organoclay. Japanese Patent No. 61/190577 shows the use of an organically modified montmorillionite clay added to a clear lacquer to prevent crack formation and protect against degradation.

It is known that organic compounds containing a cation will react with certain clays under favorable conditions by ion exchange to form an organophilic clay. Such clay modifications result in a composition which is dispersible in fluids to change the rheological properties of the system. Clays and organoclays normally are brown or off-white powders, and are known to opacify solvent systems.

It has long been understood that organophilic clays can be used to modify the viscosity and provide rheological properties to a variety of organic compositions, including paints, inks, drilling fluids, and other similar products. J. W. Jordan, in "*Proceedings of the 10th National Conference on Clays and Clay Minerals*" (1963) discussed a wide range of applications of organophilic clays as rheological additives. In some situations, the efficiency of the organophilic clay can be further improved by adding a low molecular weight polar organic material to the composition. Such polar organic materials have been called dispersants, dispersion aids, solvating agents and the like. Such organophilic clays are known to result in an opaque film and to reduce gloss when incorporated into a clear paint, lacquer or varnish system.

There has been a need for quite some time for a rheological additive for clear systems which imparts rheological properties including sag resistance and shear thinning, and which will not adversely affect the clarity, transparency and gloss of such clear systems. The incorporation of the organoclay product of the instant invention has resulted in a valuable rheological additive for a large variety of clear and transparent systems. This finding, after a relatively long period of investigation, is particularly surprising, in that organoclays have long been considered to darken and opacify systems which they thicken.

SUMMARY OF THE INVENTION

The present invention is the discovery that when the particle size of an organophilic clay is reduced to an average particle size so that more than 99% of such particles will pass through a mesh screen of 325 mesh (about 44 microns), the organophilic clay may be incorporated as an effective rheological additive in clear systems, without reducing the system's clarity and gloss. The mean particle size of such organoclay is around 8 to 10 microns.

It is believed that such size limitation is unique to organoclays, and is unique in reflecting and refracting light, so that systems containing opaque organoclay particles become transparent to light. The organophilic clay can impart rheological properties to such systems with or without pigment or other additives being present. Thus, according to one aspect of the invention, an organophilic clay thickener is provided which comprises the reaction product of a smectite-type clay and an organic cation or a mixture of organic cations. In a preferred embodiment, the organophilic clay is ground to a mean particle size of about 10 microns or below, or ground to a larger average particle size, then sieved to −325 mesh or below. It is believed that the particle size for many systems will be most preferably below 44 microns, with such effective size experimentally determined as to the specific type of clear system to be modified.

It is to be specifically understood that the organoclays of this invention are those specially manufactured to have a fine particle size. It should be understood that other methods of reducing particle size including, for example, fuming, chemical deposition, high shearing and milling in addition to grinding will create products useful in practicing the invention.

The clay which is used in the present invention is any clay which is cation exchangeable. Most preferred are the smectite-type clays. The smectite-type clays are well known in the art and are available from a variety of sources. The clays are preferably converted to the sodium form if they are not already in this form. This can conveniently be done by preparing an aqueous clay slurry and passing the slurry through a bed of cation exchange resin in the sodium form. Alternatively, the clay can be mixed with water with or without a soluble sodium compound, such as sodium carbonate, sodium hydroxide, etc., and the mixture sheared, such as with a Manton-Gaulin homogenizer, pugmill, or extruder or similar shearing equipment. Conversion of the clay to the sodium form can be undertaken at any point before reaction with the organic cation. Representatives of smectite-type clays useful in the present invention are the following: montmorillonite, bentonite, beidellite, hectorite and saponite. The preferred clays used in the present invention are bentonite and hectorite, with hectorite being most preferred. Chemical formula descriptions of several such clays are the following:

Montmorillonite

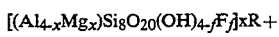
$[(Al_{4-x}Mg_x)Si_8O_{20}(OH)_{4-f}F_f]xR+$ where $0.55 \leq x \leq 1.10$, $f \leq 4$ and R is selected from the group consisting of Na, Li, NH$_4$, and mixtures thereof;

Bentonite

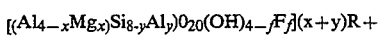
$[(Al_{4-x}Mg_x)Si_{8-y}Al_y)O_{20}(OH)_{4-f}F_f](x+y)R+$ where $0 < x < 1.10$, $0 < y < 0$, $0.55 \leq (x+y) = 1.10$, $f \leq 4$ and R is selected from the group consisting of Na, Li, NH$_4$ and mixtures thereof; and Hectorite

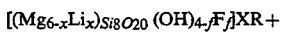
$[(Mg_{6-x}Li_x)Si_8O_{20}(OH)_{4-f}F_f]xR+$ where $0.57 \leq x \leq 1.15$, $f < 4$ and R is selected from the group consisting of Na, Li, NH$_4$, and mixtures thereof.

Smectite clay particles in nature are known to be composed of stacked crystalline "platelets" with each platelet being in the general shape of a playing card, i.e.; its dimensions are rectangular and its thickness very small compared to its length and breadth. For example, such a "platelet" may be 0.8 micron long, 0.08 micron wide and the thickness may be 0.001 micron. There is a measurable distance between the platelets. For example, the distance may be 0.001 micron. When a smectite clay is made into an organoclay, the distance between platelets is increased by the ion exchange of a relatively large organic cation, generally hydrophobic, for the sodium cation (or other ion) bound to the surface of the clay platelet. Such increased distance in the organophilic clay can vary in the range from about 0.001 to about 0.004 microns.

When organoclay particles are reduced in size according to the instant invention, it is believed that because such particles and group of platelets separate more readily in the coating system during dispersion that visible light, i.e., light within the electromagnetic spectrum discernible to the human eye is permitted largely to pass through the coating dispersion or the coated film, containing the modified clay platelets. The result is that light is not reflected back from the surface of the platelets to the observer.

The organic cations which are useful in this invention can be selected from a variety of materials that are capable of forming an organophilic clay by exchange of cations. For example, the cation may be provided by a compound selected from a group consisting of quaternary ammonium salts, phosphonium salts, and mixtures thereof. Representative types of useful organic cation compounds are enumerated in U.S. Pat. No. 4,412,018.

Preferred cation compounds for the instant invention are quaternary ammonium chloride salts. A quaternary ammonium salt of the type useful in the manufacture of compounds contemplated by this invention may be selected from the compositions of the following formula:

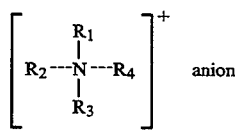

where $R_1$, $R_2$, $R_3$ or $R_4$ are selected from (a) benzyl or methyl groups; (b) linear or branched long chain alkyl radicals having 10 to 22 carbon atoms; (c) aralkyl groups such as benzyl and substituted benzyl moieties including fused ring moieties having linear or branched 1 to 22 carbon atoms in the alkyl portion of the structure; (d) aryl groups such as phenyl and substituted phenyl including fused ring aromatic substituents; (e) beta, gamma unsaturated groups; and (f) hydrogen.

The long chain alkyl radicals referred to may be derived from fatty acids contained in natural occurring oils including various vegetable oils, such as corn oil, coconut oil, soybean oil, cottonseed oil, castor oil and the like, as well as various animal oils or fats such as beef tallow. The alkyl radicals may likewise be petrochemically derived such as from alpha olefins. Preferably the fatty acids contained in beef tallow are utilized.

The anion which accompanies the organic cation is typically one that will not adversely affect the reaction product or the recovery of the same. Such anions include, for example, chloride, bromide, iodide, hydroxyl, nitrite, acetate, sulfate, or other organic anions, used in the amounts sufficient to neutralize the organic cation, with chloride being the most preferred.

The instant invention is based on the unexpected discovery that the modified organophilic clay rheological additive provided by the invention imparts high viscosity, shear thinning behavior and sag resistance to clear systems which may or may not contain pigments, e.g. paints, lacquers and varnishes, without adversely affecting their clarity and gloss. While such systems are in most cases non-aqueous solvent systems, organoclays manufactured with specific organic cations can also be utilized in latex, aqueous and other such systems.

The present invention involves reducing the particle size of such organophilic clays to enable their convenient dispersion in clear coating systems while simultaneously providing advantageous rheological properties and no loss of clarity, gloss or transparency. Such particle size can be reduced in size by use of a large number of various available processes, including grinding, pugmilling, shearing with various commercial apparatus and milling, to name but a few.

The following examples are given to illustrate the invention, but are not deemed to be limiting thereof.

EXAMPLE 1

This example illustrates the preparation of an organophilic clay to be used in clear systems according to the present invention.

45.00 grams of dried hectorite clay, which had previously been treated in water by centrifugation to remove non-clay impurities and ion-exchanged to provide the clay in sodium form, was mixed with water to form a 3% by weight slurry of clay in water. The slurry was heated to 70° C. in a reaction flask of suitable size equipped with a stirrer, thermometer and addition funnel. A predetermined amount of a quaternary ammonium chloride cation derived from beef tallow was added to the mixture. The mixture was stirred for 1 hour at 70° C. The product was filtered through a Buchner funnel to collect the solids. The wet solids were reslurried in 1500 grams of water at 70° C. for 20 minutes and then re-collected on a Buchner funnel. The filter cake was dried in a 60° C. oven for 16 hours or in a fluid bed dryer at 93° C. The dry product was milled in a Brinkmann mill to a mean particle size of about 8 to 10 microns and sieved through a −325 mesh sieve.

EXAMPLE 2

The example demonstrates the dispersion and viscosity build properties provided when the organophilic clay gellant prepared in Example 1 was used in an acrylic/melamine clear coat formulation. A "clear" paint was prepared according to a clear-coat formulation known in the art as described in Formulation 1. An organoclay prepared according to Example 1 was used to thicken the formulation. Formulation 1 is described below.

| | Formulation 1 | | |
|---|---|---|---|
| Ingredient | Generic Name | Manufacturer | Formulation (Parts by Wt.) |
| Cymel 1168 | Melamine resin | American Cyanamid | 26.06 |
| Example I | Rheological Additive | | 2.00 |
| Acryloid AT-400 | Acrylic resin | Rohm & Haas | 62.31 |
| Xylene | Xylene | Aldrich | 8.90 |
| Cycat 4040 | p-toulene sulfonic acid | American Cyanamid | 0.73 |
| Total | | | 100.00 |

The clear formulation was prepared by dispersing the Example 1 rheological additive in the melamine resin by mixing for 5 minutes at 4500 RPM using a high speed disperser. The dispersion was then heated to 60° C. for 20 minutes while mixing continued. The dispersion was cooled to room temperature and the other components added. The formulation was applied on a painted substrate at room temperature either by a brush or by spraying and then baked in an oven at 250° F. for 20 minutes. The properties of this system are shown in Table 1.

EXAMPLE 3

This example demonstrates the dispersion and viscosity build properties provided when the Example 1 organophilic clay gellant is used in a similar way to the formulation in Example 2; however, the Example 1 rheological additive was added to the acrylic resin before the addition of the melamine resin. The addition order is shown in Formulation 2.

| | Formulation 2 | | |
|---|---|---|---|
| Ingredient | Generic Name | Manufacturer | Formulation (Parts by Wt.) |
| Acryloid AT-400 | Acrylic Resin | Rohm & Haas | 26.56 |
| Xylene | Xylene | Aldrich | 8.90 |
| Example I | Rheological Additive | | 2.00 |
| Acryloid AT-400 | Acrylic resin | Rohm & Haas | 35.75 |
| Cymel 1168 | Melamine resin | American Cyanamid | 26.06 |
| Cycat 4040 | p-toulene sulfonic acid | American Cyanamid | 0.73 |
| Total | | | 100.00 |

Application and baking were the same as in Example 2. The properties of this system are shown in Table 1.

EXAMPLES 4–6

These examples demonstrate the change in application properties when the amount of the rheological additive was varied from 0.5% to 2% in the formulation of Example 2. The results are shown in Table 1.

TABLE 1

| Ex. | Dispersion (F.O.G. - Hegman) | | Brookfield Viscosity (cP) | | Sag (Mils) |
|---|---|---|---|---|---|
|  |  |  | 10 RPM | 100 RPM |  |
| 2 | 2.0 | 7.0A | 5000 | 2550 | 6.0+ |
| 3 | 2.0 | 7.0B | 6000 | 2800 | 5.5 |
| 4 | 1.5 | 7.0A | 4000 | 2000 | 6.0+ |
| 5 | 1.0 | 7.0A | 2000 | 1400 | 5.0 |
| 6 | 0.5 | 7.0A | 2000 | 1300 | 3.5 |

EXAMPLE 4

Compositions according to the present invention were tested in three additional clearcoat systems:

(a) soya alkyd based clearcoat
(b) hydroxylated polyester resin based clearcoat
(c) hydroxylated acrylate resin based clearcoat In all systems the rheological additive of the present invention was added as 1% by weight of the clearcoat system. In all three cases, a fineness of grind (Hegman) of 7.0 B or 7.0 A was achieved and after application to a substrate the coating film was clear and transparent. Traditional organophilic clays known in the art were used as controls and resulted in poor dispersion and low FOG readings in all three clearcoat systems and the dispersions were opaque and cloudy.

All the above examples exhibited dispersion, viscosity and sag properties attributable to the rheological additive utilized, equal to or better than such properties in similar non-clear systems. Most interestingly, the inventive formulations described in the Examples when dried on their respective substrates were transparent to the eye: the organoclay additive was not visible in the system when dried and each dried formulation was of pronounced clarity. This was especially surprising in view of the 1-2% by weight loading of the organoclay and the prior understanding that organoclays are opaque.

The compositions according to the present invention provide many improvements over the coating and other compositions and processes of the prior art. Novel color effects can be produced. Better hiding of surface defects can be achieved. Color, hiding, fineness of particle size and reflectance not available with other rheological additives are produced, while maintaining the appealing and desirable gloss and lustrous appearance characteristic of transparent and clear systems.

Blending of the organoclay rheological additive with organic and/or inorganic pigments is possible, with enhancement of the aesthetic effects produced. Weather durability protection and facilitated defect coverage in base coatings are only a few of the advantages achieved.

The invention being thus described, it will be apparent that the same may be varied in many ways without being a departure from the spirit and scope in the invention, and all such modifications are intended to be included within the scope of the invention.

What is claimed:

1. A method of controlling rheological properties in a clear system without a decrease in clarity, transparency or gloss comprising mixing into said system an organophillic clay with an average particle size of 44 microns or less.

2. The method of claim 1 wherein the organophilic clay has a mean particle size of 10 microns or less.

3. The method of claim 1 wherein the organophilic clay is manufactured utilizing a smectite clay.

4. The method of claim 3 wherein the smectite clay is hectorite.

5. The method of claim 3 wherein the smectite clay has been modified with a quaternary ammonium chloride compound.

6. The method of claim 3 wherein the smectite clay has been modified with a quaternary ammonium chloride compound manufactured utilizing long chain alkyl radicals derived from the group consisting of naturally occuring vegetable oils, synthetic oils and oils derived from beef tallow.

7. The method of claim 1 wherein the clear system is selected from the group consisting of non-aqueous organic solvents and aqueous latex systems.

8. The method of claim 7 wherein the clear system is selected from the group consisting of paint, ink, lacquer and varnish.

9. A clear system containing an additive which controls rheological properties in said system without a decrease in clarity, transparency or gloss, which additive comprises an organophillic clay with an average particle size of 44 microns or less.

10. The clear system of claim 9 wherein the organophilic clay is manufactured using hectorite.

11. The clear system of claim 9 wherein the organophilic clay has been modified with a quaternary ammonium chloride compound.

12. The clear system of claim 9 wherein the system is automotive paint.

* * * * *